United States Patent [19]

Ohara et al.

[11] Patent Number: 5,654,769
[45] Date of Patent: *Aug. 5, 1997

[54] DIGITAL COLOR CONTROL AND CHROMA KILLER DEVICE

[75] Inventors: Kazuhiro Ohara, Tougane; Masafumi Yugami, Kasukabe, both of Japan

[73] Assignee: Texas Instruments Incorporated, Dallas, Tex.

[*] Notice: The term of this patent shall not extend beyond the expiration date of Pat. No. 5,452,016.

[21] Appl. No.: 473,842

[22] Filed: Jun. 7, 1995

Related U.S. Application Data

[63] Continuation of Ser. No. 29,084, Mar. 10, 1993, Pat. No. 5,452,016.

[51] Int. Cl.$^6$ ........................................ H04N 9/70
[52] U.S. Cl. .................................. 348/644; 348/643
[58] Field of Search .................... 348/643–646; H04N 9/70

[56] References Cited

U.S. PATENT DOCUMENTS

| | | | |
|---|---|---|---|
| 4,253,108 | 2/1981 | Engel | 348/644 |
| 4,415,919 | 11/1983 | Miyasako et al. | 348/644 |
| 4,609,938 | 9/1986 | Suzuki et al. | 348/644 |
| 4,785,346 | 11/1988 | Yoshimochi | 348/643 |
| 5,298,798 | 3/1994 | Furumiya | 348/645 X |

FOREIGN PATENT DOCUMENTS 0537951  2/1993  Japan .................. H04N 9/68

OTHER PUBLICATIONS

"EDTV With Scan–Line Video Processor", Masafumi Yugami et al., IEEE, vol. 38, No. 3, Aug 1992.
"SVP: Serial Video Processor", Jim Childers et al., IEEE 1990 Custom Integrated Circuits Conf., May 13–16, 1990.
"Y/C Separation System by General Purpose Video Processor," Yugami et al.

Primary Examiner—John K. Peng
Assistant Examiner—John W. Miller
Attorney, Agent, or Firm—Gerald E. Laws; C. Alan McClure; Richard L. Donaldson

[57] ABSTRACT

An automatic color control and chroma killer circuit 3 and video processing system is provided that is capable of controlling an amplitude of a color signal and of performing a killer function with a simple construction without using a divider and/or vertical filter. The ACC/ACK device includes ACC and ACK circuitry which may be selectively enabled with operating signals to a selector 27. When the selector 27 enables amplitude detector 25, the amplitude detector 25 detects amplitude of the input color signal and a coefficient controller 26 compares it with a killer level. If the input color signal fails to meet the killer level then the coefficient controller 26 controls a coefficient generated by the coefficient generator 22 to perform a killer operation. The ACC operation and circuitry is thereby ACK controlled until an input color signal meets or exceeds the killer level. When the selector 27 enables the multiplier circuit 11 according to an operating signal input, the input color signal is ACC controlled by the multiplier circuit 11, and amplitude detector 21, a coefficient generator 22, a coefficient memory 23 and a delay circuit 24.

7 Claims, 10 Drawing Sheets

DIGITAL COLOR CONTROL AND CHROMA KILLER DEVICE

This is a continuation of application Ser. No. 08/029,084, filed Mar. 10, 1993 now U.S. Pat. No. 5,452,016.

BACKGROUND OF THE INVENTION

1. Field of the Invention

The present invention relates to image or video processing systems and more particularly to automatic color control and chroma killer (ACC/ACK) circuit.

2. Background of the Invention

In the prior art, there have been various image or video processing systems. An example is a digital television receiver in which a video signal of base band is digitized by an A/D converter, processed digitally and finally displayed as an analog signal by means of a D/A converter. Such devices feature relative ease of regulation and improvement of image quality by applying precision delay elements and various signal processing systems.

A prior art block circuit diagram of an image or video processing system, such as a television is depicted in FIG. 16, with reference to which signal processing will be described briefly. In FIG. 16, an input terminal for receiving an analog composite signal of base band is branched to signal and synchronizing processing systems, said signal processing system comprises an A/D converter 1, a Y (luminance signal)/C (chrominance signal) separator 2, a digital automatic color control (ACC) circuit 3, a color demodulator 10, a matrix circuit 4, and a D/A converter 5. Said synchronizing processing system comprises a burst gate 6, a synchronizing signal separator 7, a clock generator 8 and a synchronizing signal processor 9.

In the image or video processing system, the analog composite video signal input to the A/D converter 1 is converted into a digital signal and the luminance and chrominance signals thereof are separated by the Y/C separator 2. The chrominance signal is input to the demodulator 10 through the ACC circuit 3. The demodulator 10 generates a R-Y signal and a B-Y signal and supplies them to the matrix circuit 4. The matrix circuit 4 generates R, G and B signals by processing the R-Y and B-Y signals and supplies them to the D/A converter 5. The D/A converter 5 converts them back into analog R, G and B signals and supplies them to a video display device such as a monitor, etc.

Simultaneously, in the synchronizing processing system, a burst signal which is used as a reference of color phase is derived by the burst gate 6 from said analog composite video signal and a composite synchronizing signal is derived by the synchronizing signal separator 7 from the composite video signal. The composite synchronizing signal is processed in the synchronizing signal processor 9 and a horizontal synchronizing signal is supplied to the ACC circuit 3. The burst signal is supplied to the clock generator 8. The clock generator 8 generates a clock (4 fsc clock) having frequency four times that of the burst signal and supplies them to various portions of the signal processing system. Signals input to the various portions of the signal processing system are sampled at the 4 fsc clock rate.

One of the problems in a video or image processing system is that broadcast amplitudes of color signals change since the level of a composite video signal depends upon the respective TV channel. In those cases, amplitude variation may be reproduced as a variation of color saturation when R, G and B signals are generated by the matrix circuit 4. This necessitates implementation of ACC circuit 3 to maintain constant amplitude by modifying incoming color signals according to variations detected apart from a norm. Since the amplitude of the burst signal is determined according to a standard, it is possible to calculate gain necessary for a color signal within a horizontal line period in which the burst signal exists by checking an amplitude variation value of the burst signal and adjusting signal amplitude with the ACC 3.

However, there is another problem in receiving broadcast waves; there are signals containing no burst signal or signals whose S/N ratio or higher frequency gain are degraded significantly. These signals may coexist with signals containing burst signals. In such cases, a detected burst signal value becomes unstable and, if processed by the ACC circuit 3 without modification, a chroma component may be amplified in the color signal. Therefore, if the burst signal is smaller in amplitude than the constant amplitude detection value, reproduction of the color signal must be prevented automatically. This can be done with a chroma killer circuit. Additionally, the function of automatic color controlling and chroma killing has been realized in prior art by combining an ACC circuit and a chroma killer circuit.

A block circuit diagram of a prior art digital ACC circuit having a killer circuit is shown in FIG. 15. This conventional digital ACC circuit 3 is comprised of a multiplier 11, an amplitude detector 12, a horizontal average circuit 13, a divider 14, a vertical filter 15 and a killer circuit including a comparator 16 and a selector 17.

The multiplier 11 is supplied with color signals obtained by the Y/C separation of the composite video signals. The amplitude detector 12 performs an arithmetic operation (two squaring calculations) for obtaining an absolute value of the amplitude of the burst signal. Then, the horizontal average circuit 13 develops a horizontal average from the output signal of the amplitude detector 12. The divider 14 divides the horizontal average value by a reference value (reference data). The vertical filter 15 accumulates an output value from the divider 14 for ten or more lines, averages them, and supplies the averaged value to the multiplier 11 where it is multiplied with the input color signal. Thus, it is possible to make the amplitude of the color signal constant. In this case, the accumulation and averaging by means of the vertical filter 15 is to accommodate an abrupt change of multiplier due to erroneous detection of noise, etc. Since with respect to an input signal, there are few factors causing the burst signal to be changed abruptly, a time constant of the vertical filter 15 is made large.

In the killer circuit defined by a dotted line, the comparator 16 compares a multiplier determined through the vertical filter 15 with a preliminarily set maximum multiplier to identify whether the multiplier obtained from the vertical filter 15 has an unintentionally large value and, when it is larger than the maximum multiplier, provides a multiplier "0" to the multiplier 11 by switching the selector 17. As a result, the multiplier circuit 11 outputs a color signal "0" performing a chroma killer operation.

The problem with the prior art digital ACC and killer circuit is that in order to perform arithmetic operations with such construction, large scale hardware is necessary. More particularly, large scale hardware is required for implementation of the divider 14 and vertical filter 15. In addition, simplification of algorithms capable of performing digital ACC functions without degrading performance is desired. To satisfy part of the problem of reducing structure, a digital ACC circuit was developed and disclosed in Japanese Patent Application No. H3-211630. However, development of a compatible and reduced structure chroma killer circuit continued to be sought.

SUMMARY OF THE INVENTION

The present invention teaches a digital ACC and chroma killer circuit using reduced structure and simplified algorithms. The embodiment of the present invention includes a multiplier circuit for multiplying an input digital color signal with a first coefficient and outputting a color signal; an amplitude detector for detecting an amplitude value of the color signal output from the multiplier circuit; a coefficient generator for generating the first coefficient based on the amplitude value of the color signal and a second coefficient; a delay means for delaying a generated first coefficient signal to the multiplier circuit; a coefficient memory for updating the second coefficient to the first coefficient and storing the latter; a coefficient controller including comparator circuit for comparing the amplitude value of the input digital color signal with a killer level value and outputting discrimination value, a memory device for storing discrimination value output from the comparator circuit and control circuit for controlling the first coefficient generated by the coefficient generator according to the discrimination value stored in the memory device; and, a selector for selectively supplying the input digital color signal to the multiplier circuit and the coefficient controller.

Therefore, an object of the present invention is to provide improved circuit operable as a digital ACC and chroma killer circuit. A further object is to modify the digital ACC circuit disclosed in the Japanese Patent Application No. H3-211630 so that it may perform both automatic color control and chroma killer operations in a single, simplified structure.

Another object is to provide a digital ACC and killer circuit which uses simplified algorithms capable of performing digital ACC/killer functions without degrading performances.

DESCRIPTION OF THE PREFERRED EMBODIMENTS

A digital ACC and chroma killer circuit 3, system and method according to the present invention is described with reference to the accompanying drawings, where like-numbering in the various figures refer to the same or similar elements/devices.

Device

Figure 1:
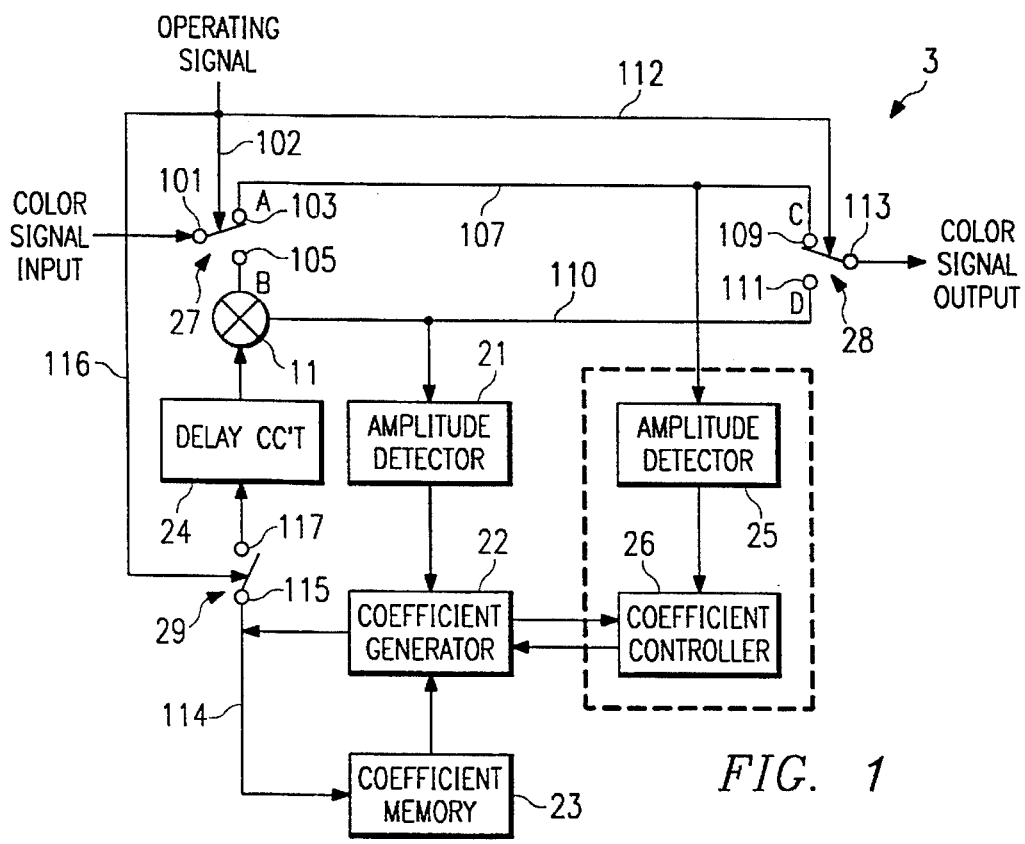
FIG. 1 shows a block circuit diagram of the preferred embodiment of a digital ACC and chroma killer circuit 3 according to the present invention.
Figure 17:
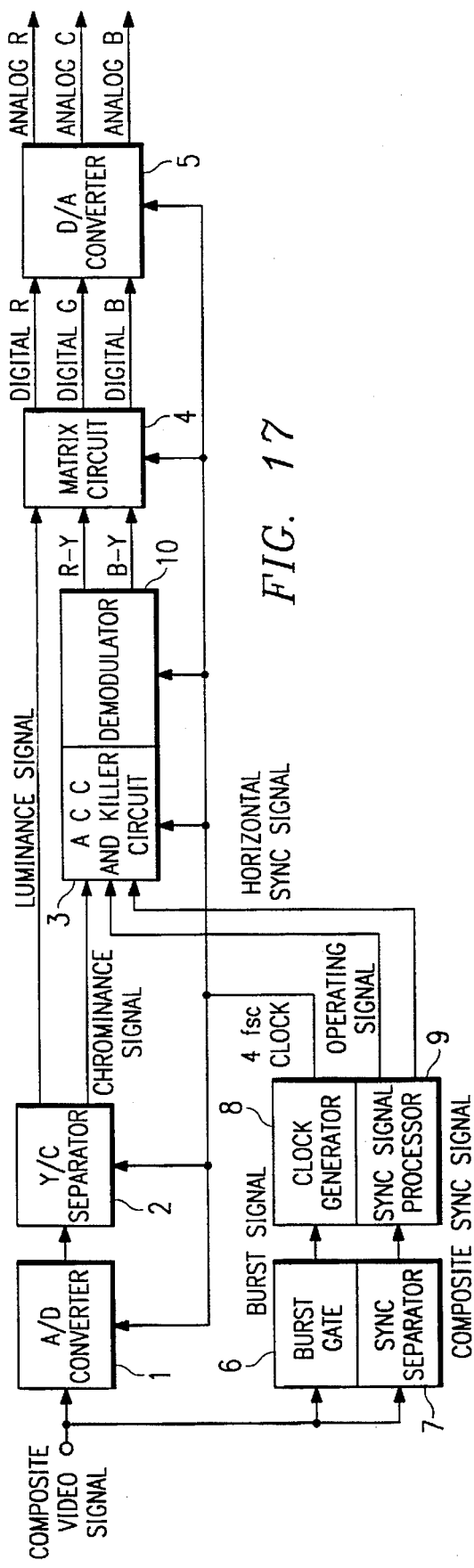
FIG. 17 shows a block circuit diagram of a digital television including an improved ACC and chroma killer circuit.

Referring to FIG. 1, the automatic color control and chroma killer (ACC/ACK) circuit 3, according to the preferred embodiment, comprises a multiplier circuit 11, an amplitude detector 21, a coefficient generator 22, a coefficient memory 23, a delay circuit 24, amplitude detector 25, a coefficient controller 26, a selector 27, a selector 28, and a switch 29. The ACC/ACK circuit 3 is designed to receive a digital input color signal at input 101. Input 101 is connectable through selector 27 to terminal 103 or 105, output 113 is connectable through selector 28 to terminal 109 or 111, and terminal 115 is connectable to terminal 117 through switch 29 according to an operating signal input to selector 27 from a synchronous signal processor 9 as shown in FIG. 17. Input 101 connects in the automatic chroma killer (ACK) configuration to ACK circuitry and output 113 through bus 107. In the automatic color control (ACC) configuration, input 101 connects to ACC circuitry and output 113 through bus 110.

The ACK circuitry includes the amplitude detector 25 connecting to coefficient controller 26, coefficient controller 26 connecting to coefficient generator 22, and coefficient generator 22 connecting to coefficient memory 23.

The ACC circuitry comprises an amplitude detector 21, a coefficient generator 22 attached to the amplitude detector 21, the coefficient controller 26, and coefficient memory 23, and including an output for sending generated coefficients to both the coefficient memory 23 and multiplier 11. The multiplier 11, when connected in the ACC mode may receive an input color signal and multiply said signal with the coefficient generated by coefficient generator 22 and send the result to output 113.

Figure 2:
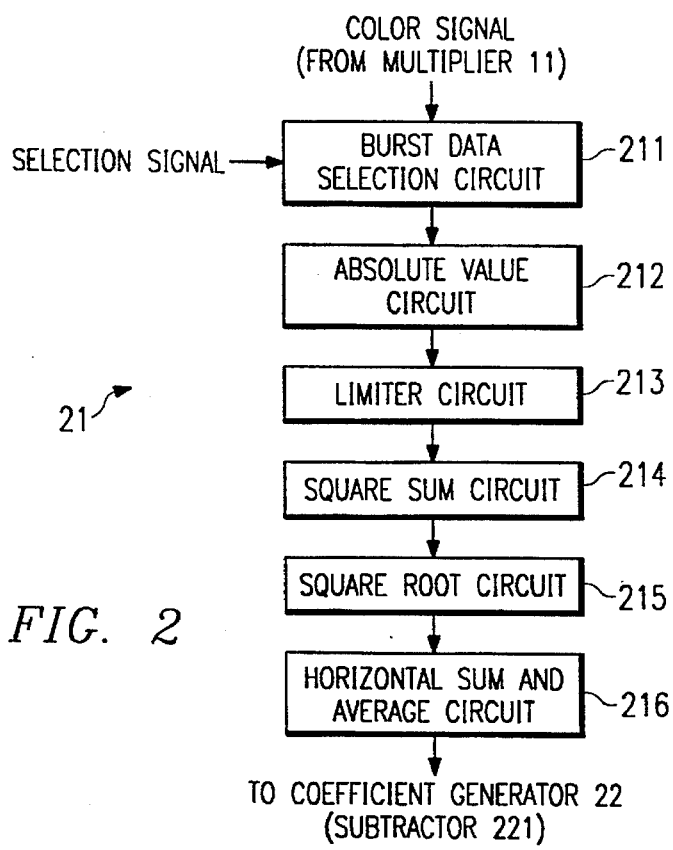
FIG. 2 shows a block circuit diagram of an amplitude detector 21.

Referring to FIG. 2, the amplitude detector 21 comprises a burst data selector 211, an absolute value circuit 212, a limiter circuit 213, a square sum circuit 214, a square root circuit 215 and a horizontal sum averaging circuit 216.

Figure 3:
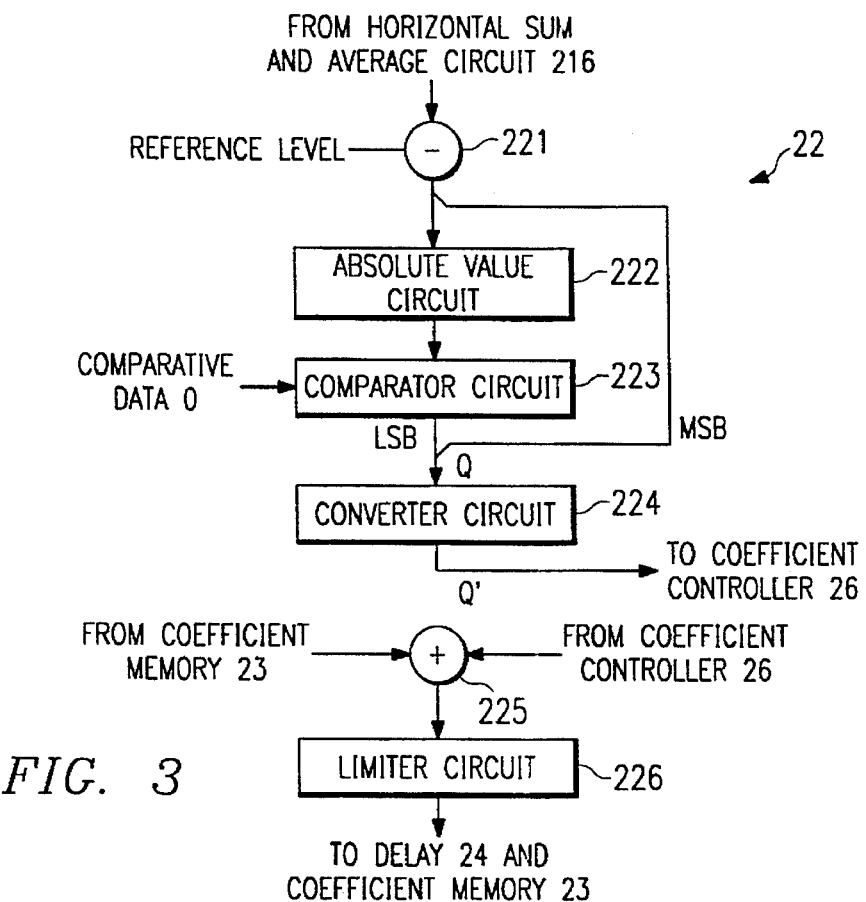
FIG. 3 shows a block circuit diagram of a coefficient generator 22.

Referring to FIG. 3, the coefficient generator 22 comprises a subtracter 221, an absolute value circuit 222, a comparator circuit 223, a converter circuit 224, an adder/subtracter circuit 225 and a limiter circuit 226. The coefficient generator 22 serves to determine whether the color signal is to be corrected by the data obtained by the amplitude detector 21 mentioned above.

Figure 4:
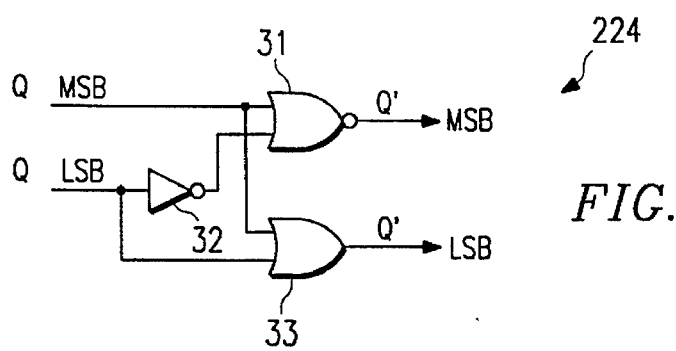
FIG. 4 shows a block circuit diagram of a converter circuit 224.

Referring to FIG. 4, the converter circuit 224 comprises a NOR circuit 31, an inverter 32 and an OR circuit 33. The MSB of the detection output Q is supplied to one of the input terminals of the NOR circuit 31 and the LSB of the detection output queue is supplied to the inverter 32 having an output terminal connected to the other input terminal of the NOR circuit 31. The MSB of the detection output Q is also supplied to one input terminal of the OR circuit 33 and the LSB is supplied to the other input terminal thereof. The MSB of a conversion output Q' is obtained at an output of the NOR circuit 31 and the LSB of the conversion output Q' is obtained at an output of the OR circuit 33.

Figure 5:
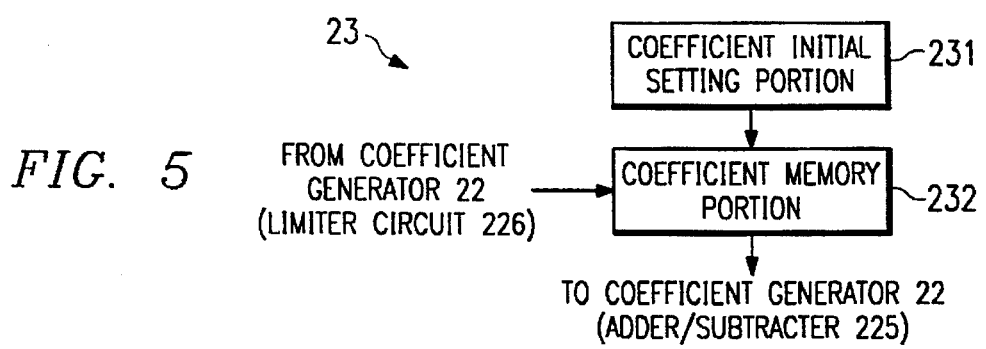
FIG. 5 shows a block circuit diagram of a coefficient memory 23.

Referring to FIG. 5, the coefficient memory 23 comprises a coefficient initial setting portion 231 and a coefficient memory portion 232 (the coefficient initial setting portion 231 may be not always necessary as mentioned above). The value (coefficient data) input to the coefficient memory 23 is saved in the coefficient memory portion 232.

Figure 6:
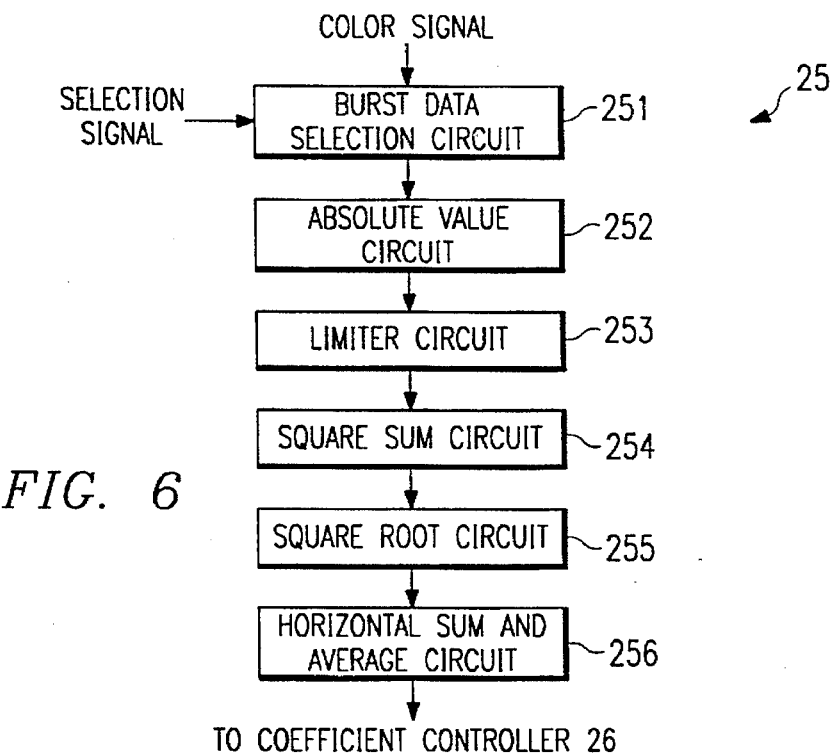
FIG. 6 shows a block circuit diagram of an amplitude detector 25.

Referring to FIG. 6, the amplitude detector 25 is comprised of a burst data selector 251, an absolute value circuit 252, a limiter circuit 253, a square sum circuit 254, a square root circuit 255 and a horizontal sum and average circuit 256. The amplitude detector 25 has a similar construction to that of the amplitude detector 21 and operates similarly. Therefore, details thereof are omitted.

Figure 7:
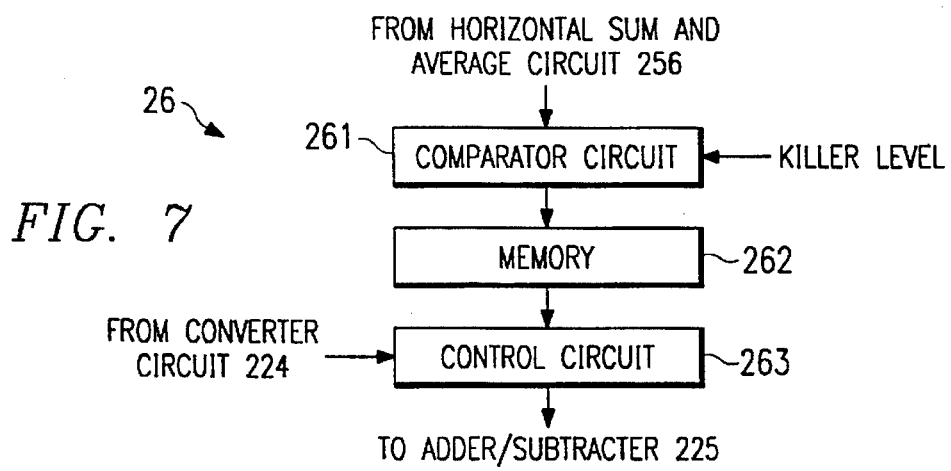
FIG. 7 shows a block circuit diagram of a coefficient controller 26.

Referring to FIG. 7, the coefficient controller 26 is comprised of a comparator circuit 261, a memory 262 and a control circuit 263. Referring to Table 2 a relation is shown between an operating signal input to the selector 27, output signals of the comparator circuit 261 and the converter circuit 224, and, an output signal of the control circuit 263.

Figure 8:
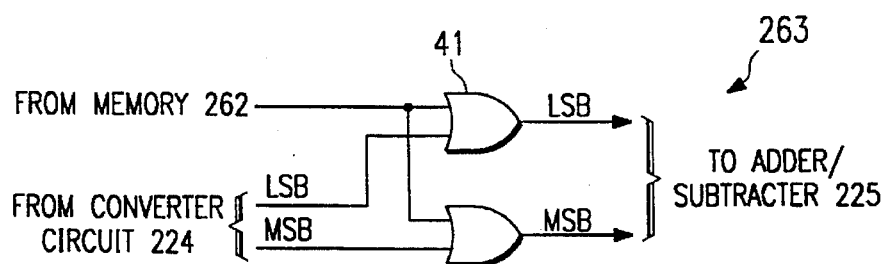
FIG. 8 shows a block circuit diagram of a control circuit 263.

Referring to FIG. 8, the control circuit 263 is comprised of OR circuits 41 and 42. The OR circuit 41 is supplied with an output of the memory 262 and the LSB of the converter circuit 224 shown in FIG. 3 and the OR circuit 42 is supplied with the output of the memory 262 and the MSB of the converter circuit 224 in FIG. 3. An output (MSB, LSB) of the control circuit 263 is supplied to the adder/subtracter 225 shown in FIG. 3.

Figure 9:
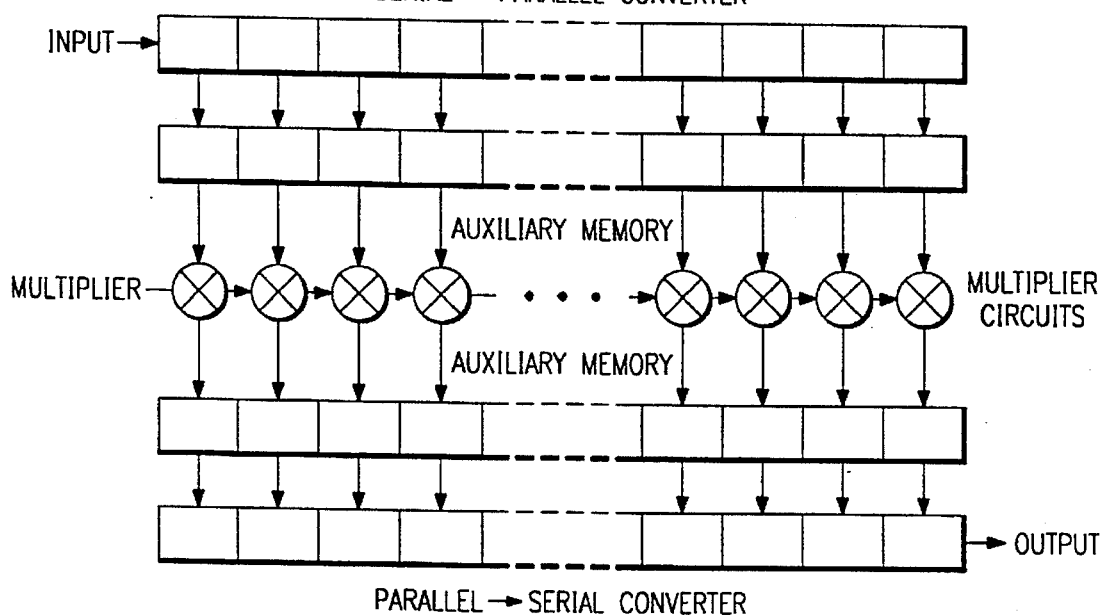
FIG. 9 shows a block circuit diagram of a multiplier circuit 11.

Referring to FIG. 9, the multiplier 11 multiplies in parallel all data (for example 512 bits) of line 'n' to the coefficient generated by the coefficient generator 22. On the other hand, the ACC/ACK circuit 3 with the exception of multiplier 11 processes data of line 'n' one bit at a time. A scan line video processor (SVP) developed by Texas Instruments, Inc. is known as one of the devices performing parallel multiplication of bits obtained serially. Jim Childers, et al, "SVP: SERIAL VIDEO PROCESSOR", IEEE 1990 Custom Integrated Circuit Conference, 17.3.1-17.3.4, May 13-16, 1990 and Masafumi Yugami, Victor Company of Japan Ltd., and Kazuhiro Ohara, Texas Instruments Japan Ltd., "Y/C separation system by General Purpose Video Processor", pages 427-428, Annual Meeting of Association for Television, 1990 describe such multiplication. As shown in FIG. 9, the multiplier 11 is a parallel, high speed multiplier through which a coefficient (operand) delivered through delay circuit 24 from coefficient memory 23 may be multiplied simultaneously with a series of color signals (multiplicands) representing horizontal data.

Further, although, in this embodiment, the amplitude detector 21 for ACC operation and the amplitude detector 25 for chroma killer operation are provided separately, it is possible to use a single amplitude detector to perform both operations. Such a single amplitude detector may be preferable when the digital ACC and chroma killer circuit according to the present invention is realized in hardware and the separate amplitude detectors may be preferable when it is realized in software.

Method

Figure 10:
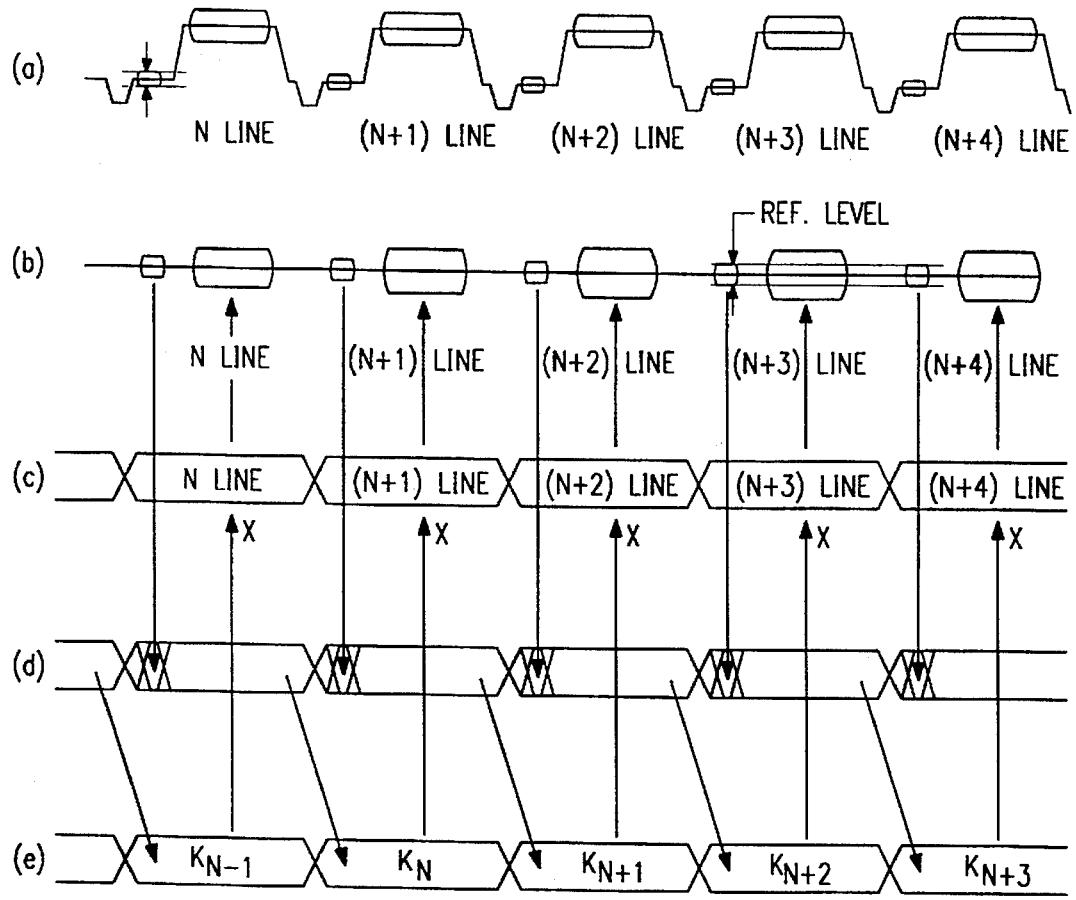
FIG. 10 shows waveforms for the digital ACC and chroma killer circuit according to the present invention.
Figure 10F:
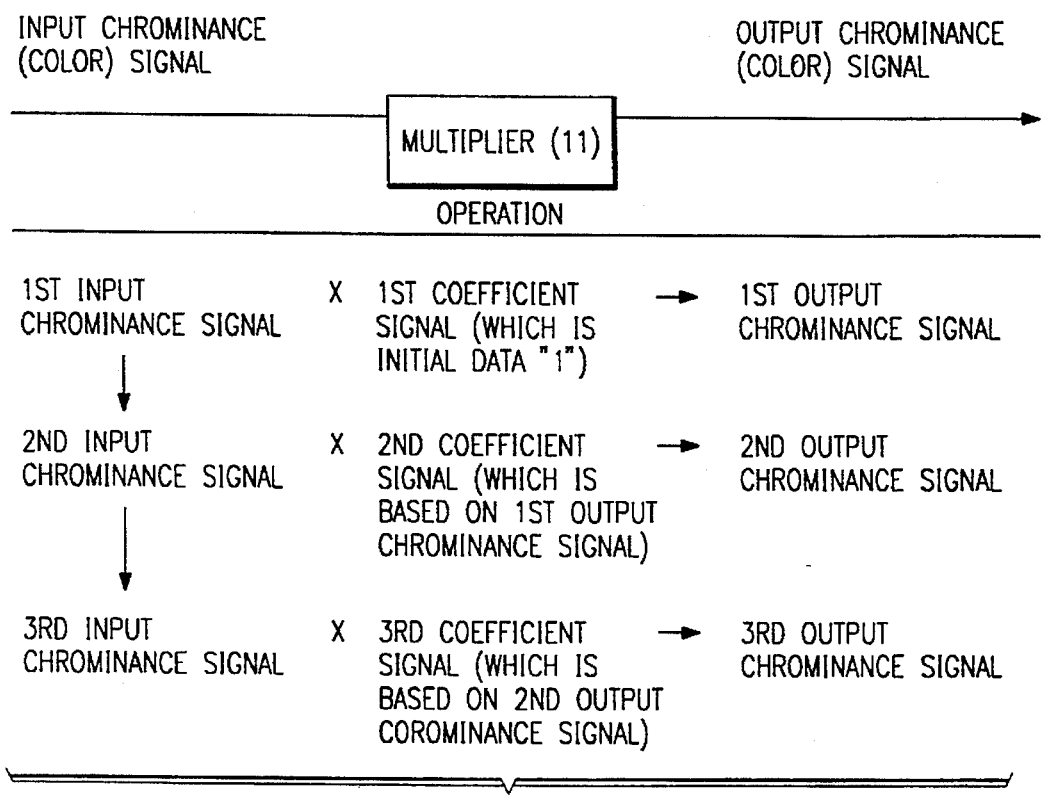
Figure 10G:
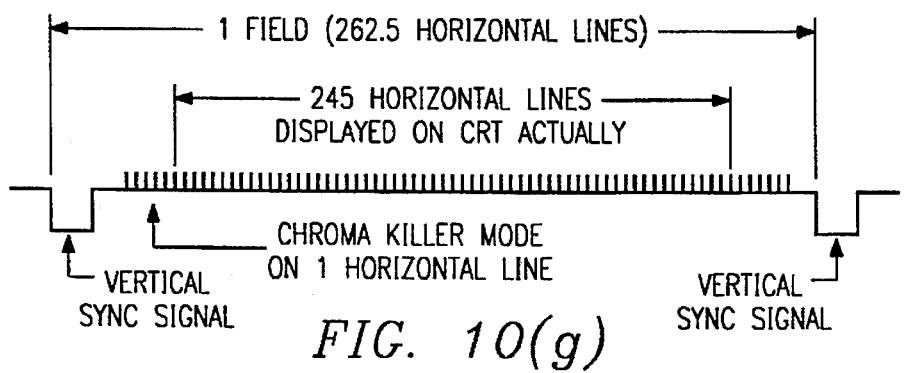
Figure 10H:
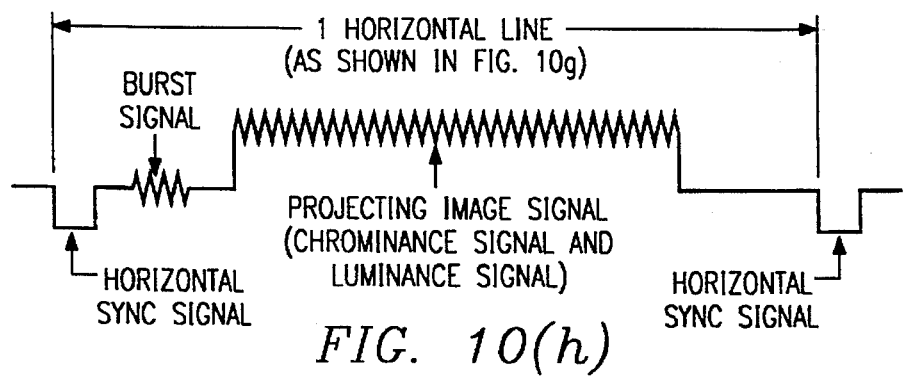
Figure 10I:
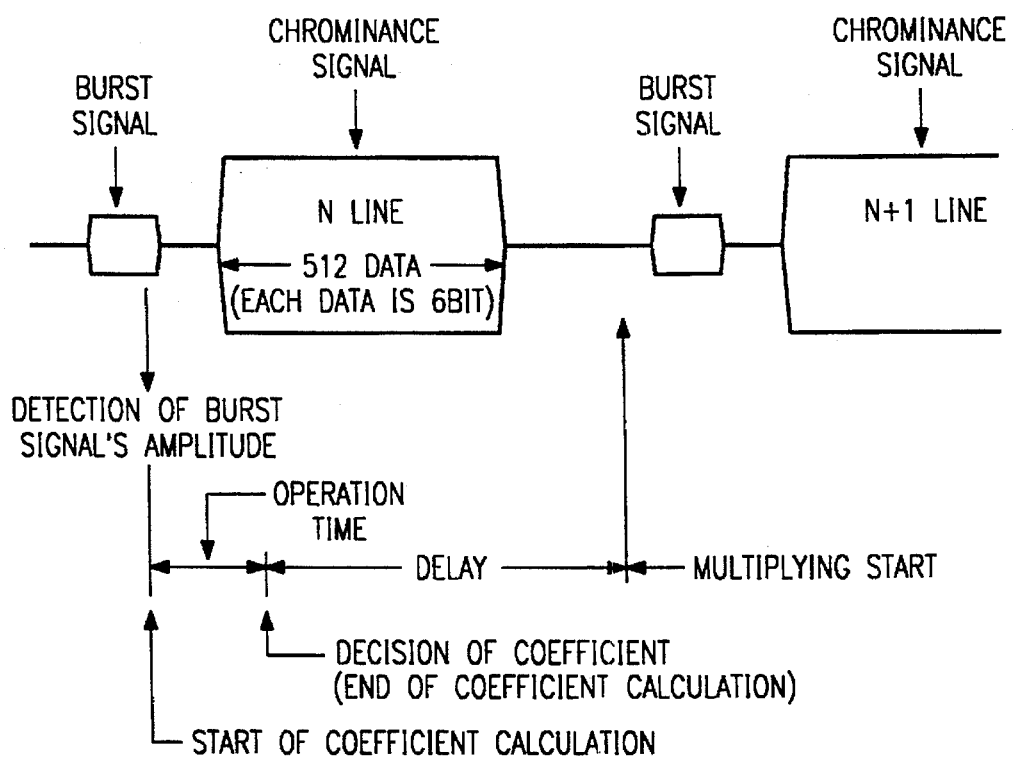

Referring to FIGS. 10(g)-(i), a mode of a circuit shown in FIG. 1 is changed to ACC mode (setting 'B') or chroma killer mode (setting 'A') during one field (i.e. a period between a vertical synchronous signal and a next vertical synchronous signal shown in FIG. 10(g)) with an operating signal sent from an outside device such as synchronous signal processor 9 shown in FIG. 17.

A period of chroma killer mode is one horizontal scanning period in one field, but a chrominance signal of mentioned one horizontal scanning period is not displayed on CRT. In actual TV systems, a part of the horizontal lines in one field are not displayed on CRT. For example as shown in FIG. 10(g), 245 out of 262.5 horizontal lines comprising one field are displayed on a CRT. Therefore, the period of a chroma killer mode equalling one horizontal line may be chosen so as not to be displayed on the CRT. During a field period except when in ACK mode, the ACC/ACK circuit 3 should operate in ACC mode.

In the chroma killer mode, an input chrominance (color) signal is output as an output chrominance signal, however, said output chrominance signal is not displayed on the CRT as disclosed above. The circuit shown in FIG. 1 may be set to chroma killer mode when the operating signal, which is one bit data, is "1," and may be set to ACC mode when the operating signal is "0." The operating signal is generated by the synchronous signal processor 9 (shown in FIG. 17) based on an input composite synchronous signal (a vertical synchronous signal and a horizontal synchronous signal).

ACK Mode

ACK mode occurs when the selector 27 operates to select the amplitude detector 25 and the ACC/ACK circuit 3 functions as a digital chroma killer circuit. At Setting 'A' (terminal 103), the input color signal is sent through selector 27 to amplitude detector 25 and through selector 28 as an output color signal. Switch 29 is turned off, so that no signal is sent through the delay circuit 24 and multiplier 11.

Referring to Table 2 a relation is shown between an operating signal input to the selector 27, output signals of the comparator circuit 261 and the converter circuit 224, and, an output signal of the control circuit 263.

When the operating signal input to the selector 27 has a value, for example, "1", with which the selector 27 is connected to the amplitude detector 25, the selector 27 supplies the input color signal to the amplitude detector 25. A value obtained from the amplitude detector 25 is compared by the comparator circuit 261 of the coefficient controller 26 with a killer level value (referred to simply as killer level hereinafter) input to the comparator circuit 261. In the case where the value (amplitude value) from the amplitude detector 25 is larger than the killer level, the comparator circuit 261 outputs a value "0". When the value from the amplitude detector 25 is smaller than the killer level, the comparator 261 outputs a value "1". The killer level preliminarily selected as a value necessary for killer operation.

The output (discrimination value) of the comparator circuit 261 is supplied to the memory 262 which is then updated. A content of the memory 262 can be updated only when the selector 27 is connected to the amplitude detector 25 (i.e. during ACK mode). For example, when the output of the comparator circuit 261 is "1", that is, when it is determined that the value of the horizontal sum and average circuit 256 is smaller than the killer level, the output of the comparator circuit 261 is supplied to the memory 262 and stored therein. The newly stored value is then sent to control circuit 263. Referring to FIG. 8, the control circuit 263 is comprised of OR circuits 41 and 42. The OR circuit 41 is supplied with an output of the memory 262 and the LSB of the converter circuit 224 shown in FIG. 3 and the OR circuit 42 is supplied with the output of the memory 262 and the MSB of the converter circuit 224 in FIG. 3. An output (MSB, LSB) of the control circuit 263 is supplied to the adder/subtracter 225 shown in FIG. 3.

As shown in Table 2, if the amplitude value is smaller than the killer level while in ACK mode, then the control circuit 263 outputs the two's complement value (11), (i.e. −1) to the adder/subtracter 225 of the coefficient generator 22 regardless of any value received from the converter circuit 224 of the coefficient generator 22 during the following ACC mode. As an example, since the value from the amplitude detector 25 when there is no burst signal is smaller than the killer level, the value of the coefficient memory 23 is continuously decremented down to (000000000000) which is multiplied with the input color signal during ACC mode to obtain a killer effect thereon.

Thus, once ACK mode has been activated and the obtained amplitude value from amplitude detector 25 is found to be smaller than the killer level, chroma killer operation is maintained during the following ACC mode and through the ACC circuitry by reducing the coefficients, and hence the corresponding output color signal to zero.

In other words, when the value of the operating signal input to the selector 27 is, for example, "0" with which the selector 27 is connected to the multiplier circuit 11, the content of the memory 262 of the coefficient controller 26 is unchanged and held the value immediately before the operating signal becomes "0". Therefore, if coefficient controller 26 is activated during ACC mode when the content of memory 262 is at "1", then the value of coefficient memory 23 is continuously decreased until the content of memory 262 is changed during a next occurring ACK mode where a higher signal than the value of killer level is processed through chroma killer controller. Therefore, the coefficient controller 26 continues its ACK operation even after the selector 27 re-initiates ACC mode and is connected to the multiplier circuit 11. The selector 27 is particularly effective when the circuit of the present invention is constructed with, for example, a software control device and it is desired to realize different circuit operations by switching software loops in a time sharing manner such that it performs only ACC operation when the operating signal is "0" and performs a discrimination of killer control when the operating signal is "1". This provides a more efficient implementation of an algorithm compared with the case where the two circuits are continuously operated.

As may be perceived by the prior discussions and considerations of the Figures and Tables when it is desired to perform the killer operation, memory 262 is set to decrement by 1 and the coefficient controller 26 instructs the coefficient generator to extract 1 from the existing coefficient stored in coefficient memory. The coefficient stored in memory is decremented and updated during each successive operation of the ACC circuit. An effective operating period is required for the chroma killer operation during which the coefficients (operation) are interactively reduced to zero. This occurs during a portion of the field period which is limited to a period outside the effective image display period for a television signal.

ACC Mode

Setting 'B' occurs when the selector 27 selects the multiplier circuit 11 and the ACC and chroma killer circuit shown in FIG. 1 operates as a digital ACC circuit. When the selector 27 selects a connection to the multiplier circuit 11 according to the operating signal, the selector 28 is connected to the multiplier circuit 11 in synchronism therewith and the switch 29 is turned on. The multiplier circuit 11 is supplied with a color signal obtained by Y/C separation of the composite video signal shown in FIG. 10(a). In turn, the color signal is ACC-controlled and the resulting waveform is shown in FIG. 10(b). The object of the ACC circuit is to modify the amplitude of the burst signals to that of an original or reference burst signal and simultaneously provide corresponding gain to the corresponding color signals.

Prior to operation of the ACC/ACK circuit 3, a coefficient (coefficient data) in the coefficient memory 23 is set to an initial value. In this embodiment, the initial value of the coefficient is set to a value of '1'. Bit width of the coefficient memory 23 determines gain width and accuracy (accuracy of regulating the amplitude value of the color signal) of the ACC circuit and is 12 bits in this embodiment.

Figure 13A:
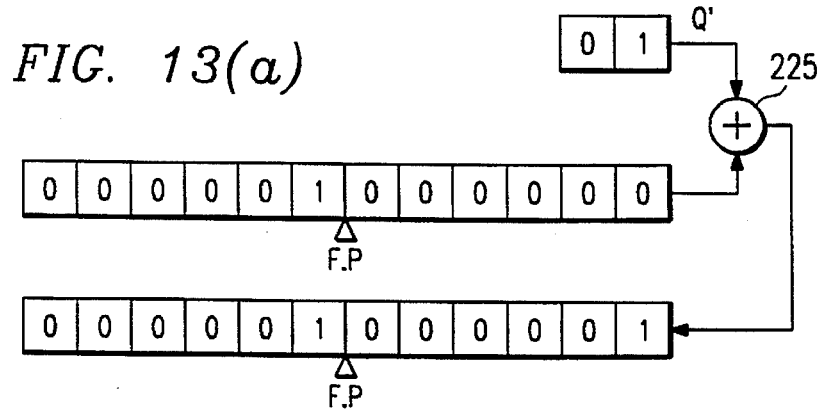
FIG. 13 shows operations of the coefficient generator 22 and the coefficient memory 23.

As best seen in FIGS. 13(a) and (b), the floating point (f.p.) is located to permit 6 bits before and after the decimal point. Thus, when the value of coefficient in the coefficient memory 23 is (000001000000), a gain of 1 time is given to the color signal and, when it is (111111111111), a gain of 63.984375 times is given to the color signal. The minimum accuracy becomes $1/64 = 0.015625$. The above mentioned setting of the coefficient memory 23 in this embodiment is selected since the color signal is usually 6 bits or less when the video signal is quantized with 8 bits. The purpose of the initial value setting is to avoid unstableness of an initial converging operation and therefore it can be omitted if unnecessary.

After start of operation of the ACC circuit, the multiplier circuit 11 multiplies the input color signal with the value in the coefficient memory 23 and outputs a result through output 113 as an ACC-controlled signal shown in FIG. 10(b). As shown in FIGS. 10 (b & d), a region of the input burst signal is output and therefore input to the amplitude detector 21.

A coefficient multiplied to N+1 line's chrominance signal is based on N line's burst signal, because of the time required for coefficient calculation which may be recognized as a recursive operation. If the coefficient generated for N line's signal were multiplied onto N line's signal, better performance of the ACC and chroma killer circuit would occur; however, hardware of the ACC and chroma killer circuit becomes larger and more complex.

An abrupt change of the chrominance signal may occur where the signal-to-noise ratio (SNR) is small. In that case, as it is impossible to effectively remove noise from signal, it is not meaningful to have ACC and chroma killer operations on the chrominance signals.

The color signal output by the multiplier circuit 11 is supplied to the burst data selector 211. The burst data selector 211 responds to a selection signal in the form of a pulse to select a burst signal (burst data) at the time of the selection signal input and supplies the burst signal to the absolute value circuit 212.

Figure 11A:
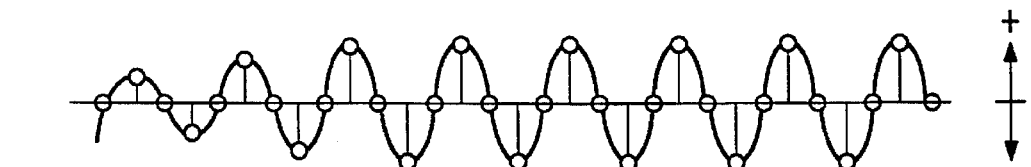
FIG. 11 shows processing of a burst signal in the amplitude detector 21.
Figure 11B:
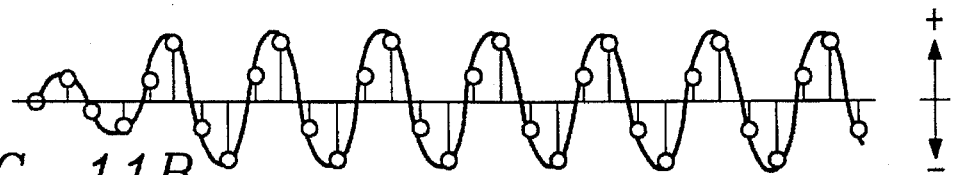
Figure 11C:
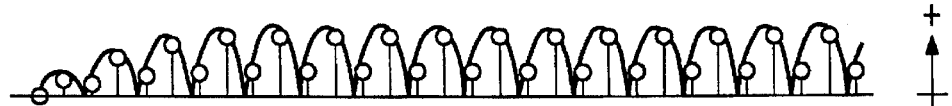

Since the color signal (including the burst signal) in the amplitude detector 21 is a signal having plus and minus values as shown in FIG. 11(a), it is processed by the absolute value circuit 212 and supplied to the limiter circuit 213 limits bit number to 6 which is a maximum value usually considered as shown in FIG. 11(c). Therefore, any signal exceeding 6 bits is restricted in this stage.

An output signal from the limiter circuit 213 is further processed by the square sum circuit 214 and then the square root circuit 215. Although the signal shown in FIG. 11(a) has the burst portion correctly sampled, a signal shown in FIG. 11(b) is an example of sampling data when phase of a sampling clock is deviated from that of a sub-carrier. As is clear from FIG. 11(b), a peak value of the burst signal depends upon the sampling phase. In order to exclude influence of such variation of peak value, values of adjacent two data are squared and summed by the square sum circuit 214 and then a root value of the result is obtained the square root circuit 215. Describing this mathematically, when the signal is sampled at a clock (4 fsc clock) having frequency which is 4 times that of the sub-carrier, adjacent two burst data can be represented by the following equations:

$$\alpha = A \sin(wt+\Theta) \quad (1)$$

$$\beta = A \cos(wt+\Theta) \quad (2)$$

where A is an absolute value of an original burst signal and $\Theta$ is a difference in phase between the sub-carrier and the sampling clock (4 fsc clock). Therefore, the absolute value A can be obtained by the equations (1) and (2) as shown below:

$$A = (\alpha^2 + \beta^2)^{1/2} \quad (3)$$

Figure 11D:
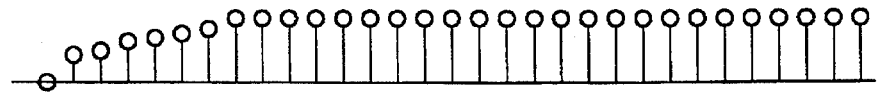

The result obtained by the equation (3) is shown in FIG. 11(d).

Figure 12A:
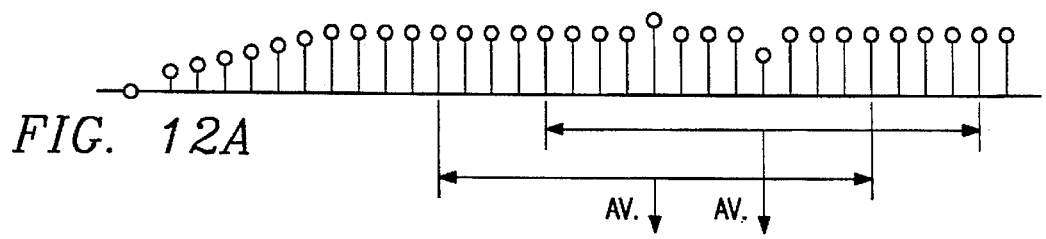
FIGS. 12 (a) and (b) show a processing of a burst signal in the amplitude detector 21 and (c) shows an arithmetic operation in the coefficient generator 22.
Figure 12B:
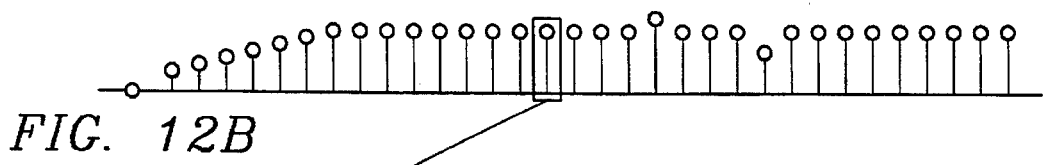

Further, the input signal may contain a noise component. In this embodiment, in order to minimize influence of erroneous detection caused by such noise, the signal output by the square root circuit 215 is supplied to the horizontal sum and average circuit 216 in which a horizontally summed and averaged signal is obtained. FIG. 12(a) shows a variation of the amplitude value of the burst signal due to noise, etc., mixed therein. Amplitudes of such signal as shown in FIG. 12(a) are summed and averaged within the burst signal to obtain horizontally summed and averaged values (av) to thereby make them substantially constant as shown in FIG. 12(b).

Figure 12C:
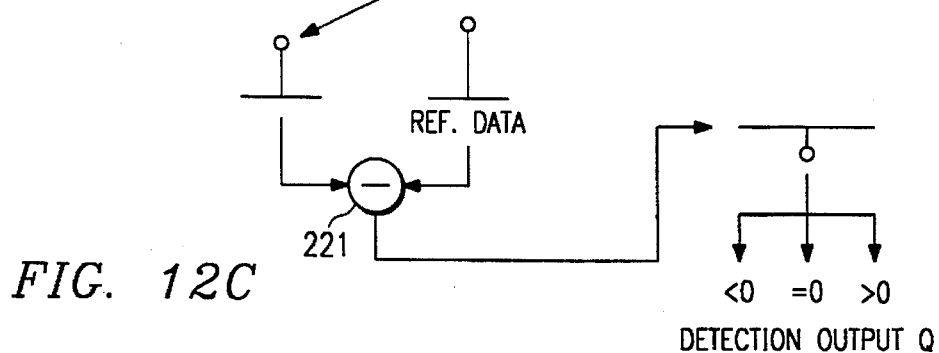

A signal (6 bits) output by the horizontal sum and average circuit 216 in the amplitude detector 21 is supplied to the subtracter 221 of the coefficient generator 22. The subtracter 221 contains a reference value of amplitude (ref. data) preliminarily and subtracts the signal output from the amplitude detector 21 by the reference value (6 bits). As a result, an error signal (7 bits) is obtained as shown in FIG. 12(c). Most significant bit of this 7-bit signal, representing plus or minus, is supplied to the converter circuit 224 and the remaining 6 bits are supplied to the absolute value circuit 222 to obtain absolute values thereof and then the absolute values are supplied to the comparator circuit 223. The comparator circuit 223 has a comparative data 0 (6 bits) and compares the latter with the input signal, providing a 1-bit output signal.

A detection output Q of 2 bits is obtained with the 1 bit signal representing plus or minus being the most significant bit (MSB) and the 1 bit signal output from the comparator circuit 223 being the least significant bit (LSB).

The detection output Q is supplied to the converter circuit 224. Referring to FIG. 4, the converter circuit 224 comprises a NOR circuit 31, an inverter 32 and an OR circuit 33. The MSB of the detection output Q is supplied to one of input terminals of the NOR circuit 31 and the LSB of the detection output Q is supplied to the inverter 32 having an output terminal connected to the other input terminal of the NOR circuit 31. The MSB of the detection output Q is also supplied to one input terminal of the OR circuit 33 and the LSB is supplied to the other input terminal thereof. The MSB of a conversion output Q' is obtained at an output of the NOR circuit 31 and the LSB of the conversion output Q' is obtained at an output of the OR circuit 33.

The conversion output Q' obtained by the converter circuit 224 is a discrimination signal indicating a relation between the reference value and the burst signal amplitude. More particularly, the circuitry from the subtracter 221 to the converter circuit 224 comprise a discrimination signal generator circuit for generating the discrimination signal indicating the relation between the reference value and the burst signal amplitude. In this embodiment, the conversion output Q' is a 2-bit signal and classified into three values corresponding to: "smaller than the reference value (<0)", "equal to the reference value (=0)" and "larger than the reference value (>0)", respectively, which are minimum conditions indicating basic classification states. The conversion of the detection output Q of the converter circuit 224 into the conversion output Q' is as shown in Table 1.

The conversion output Q' is expressed in 2's complement such that (01), (00) and (11) mean +1, 0 and −1, respectively. These numbers correspond to classification of states and not to numerical values. What is important in the converter circuit 224 is to generate a plurality of values for controlling modification of the stored coefficient in the coefficient memory 23 according to the state of the output from the amplitude detector 21.

The value of the conversion output Q' is supplied to the coefficient controller 26 and in response thereto, an output of the coefficient controller 26 is supplied to the adder/subtracter 225 of the coefficient generator 22. Said output of the coefficient controller 26 is then added to the value (coefficient data). supplied by the coefficient memory 23. (The operation of the coefficient controller 26 will be described later).

Figure 13B:
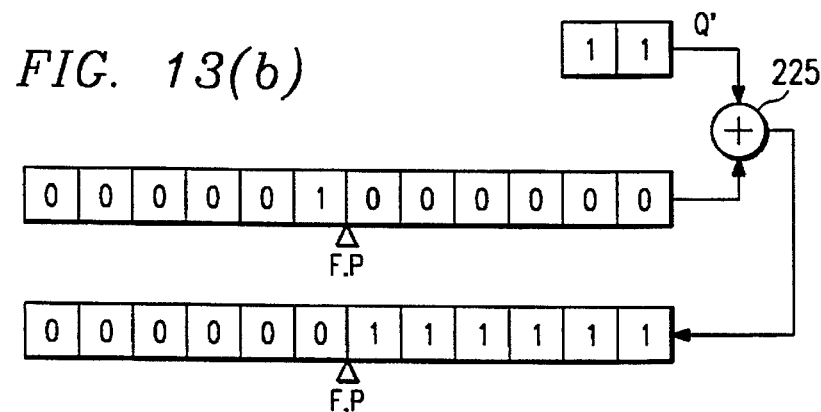

FIGS. 13(a) and 13(b) show examples of arithmetic operation of the adder/subtracter 225. In this embodiment, an addition is performed in 2's complement, that is, with sign, and, when the conversion output Q' is (11), the adder/subtracter 225 functions as a subtracter. In the example shown in FIG. 13(a), the adder/subtracter 225 is supplied with (01) comprising the conversion output Q' and (000001000000) comprising the coefficient stored in coefficient memory 23, and outputs a new increased coefficient value (000001000001). In the example shown in FIG. 13(b), the conversion output is (11) and the adder/subtracter 226 outputs a new decreased coefficient value (000000111111). "f.p." in these figures indicates a decimal point.

The updated coefficient value thus obtained is supplied through the limiter circuit 226 to delay circuit 24 and the coefficient memory 23. The value (coefficient data) input to the coefficient memory 23 is saved in the coefficient memory portion 232.

As shown in FIG. 10, by multiplying the coefficient data (shown in FIG. 10(e) and delayed by 1 line) with the color data (FIG. 10(c)) incoming next, an ACC-controlled color signal (FIG. 10(b)) is obtained. Further, the burst data (FIG. 10(d)) is obtained from the result and the coefficient data of the coefficient memory 23 is updated continuously as shown in FIG. 10(e). When the output of the amplitude detector 21 is equal to the reference value, the coefficient data of the coefficient memory 23 becomes a value not updated, that is, 0 is added thereto. If the amplitude value changes again, the system starts to follow it so that the value becomes equal to the reference value.

Figure 14A:
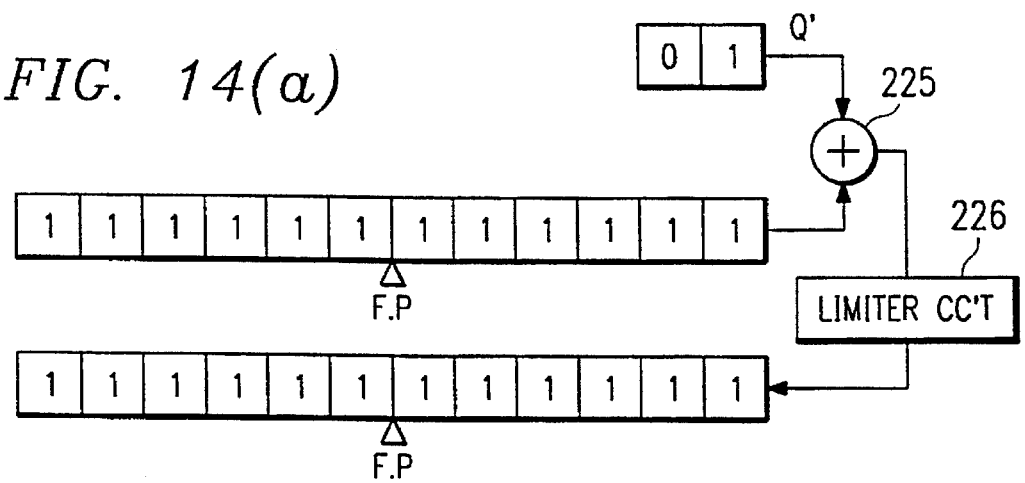
FIGS. 14 (a) and (b) show an operation of the limiter circuit and (c) shows a characteristic curve of the limiter circuit 226.
Figure 14B:
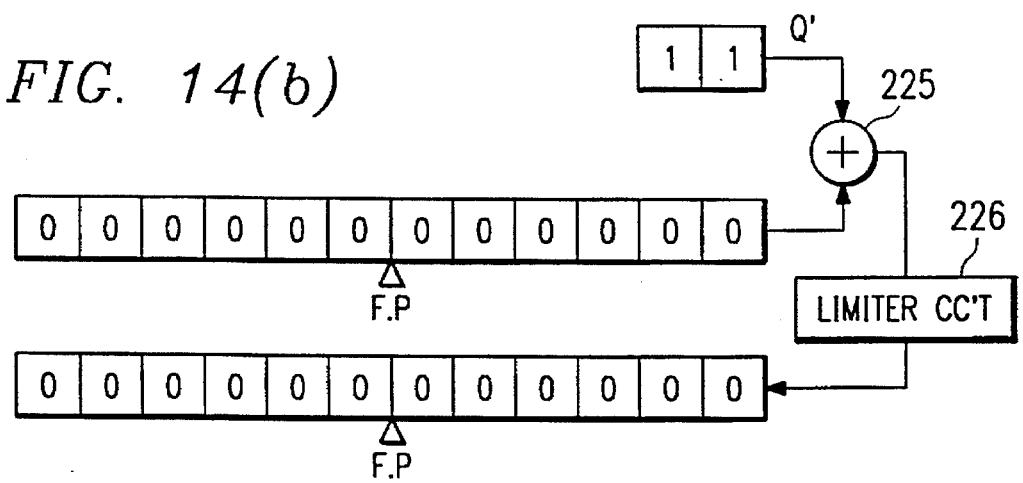
Figure 14C:
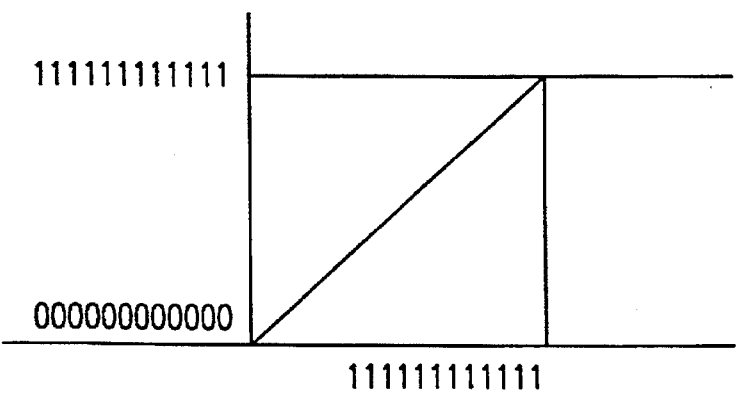
Figure 15:
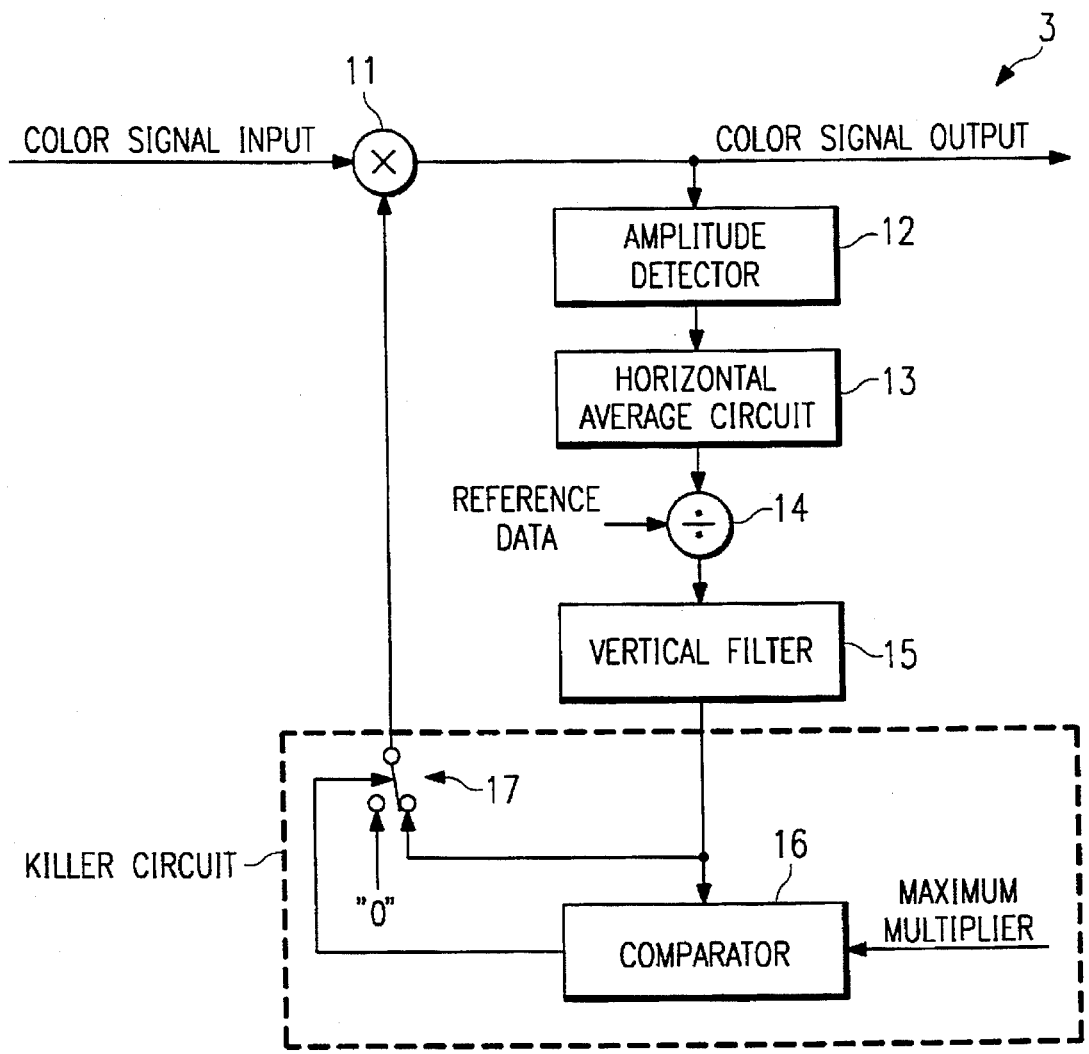
FIG. 15 shows a block circuit diagram of a prior art digital ACC and killer circuit 3.

As shown in FIG. 14(a), when the value of the coefficient memory 23 becomes the maximum value (111111111111)

and saturated, the value is held as it is by the operation of the limiter circuit 226 even if (01) is input to the adder/subtracter 225 as the conversion output Q'. On the contrary, as shown in FIG. 14(b), when the value of the coefficient memory 23 is saturated by becoming (000000000000) which is the minimum, it is held as it is by the operation of the limiter circuit 226 even if (11) is input to the adder/subtracter 225 as the conversion output Q'. FIG. 14(c) shows a characteristic curve of the limiter circuit 226 performing such limiting operation.

In determining the operator (coefficient) input to the multiplier 11, elapsed time must be accounted for in order to synchronize operations. The delay circuit 24 serves to correct time difference in order to multiply the operator input obtained with the input color signal in a horizontal period as shown in FIG. 10. The queing of signals is best seen in FIGS. 10(f)–(i).

Additionally, although according to the present invention the ACC/ACK circuit 3 may be insensitive to abrupt changes of color signal where multiplication operators (coefficents) are developed from prior color signals or information and then multiplied onto later color signals, such abrupt changes of color signal are usually caused by noise and corrected by signal processing circuitry, making it unnecessary to follow abrupt changes of color signal. Therefore, the digital ACC/ACK circuit 3 according to the present invention teaches a very practical solution to a combined automatic color controller and killer circuit.

invention does not follow an abrupt change of color signal nor provide an abrupt killer effect a remarkable reduction of noise caused by ACC/ACK circuitry of the prior art is effected. Further, since it is possible to perform the ACC/ACK discriminating operations arbitrarily in a time sharing manner, it is possible to realize an efficient software algorithm when the digital ACC and chroma killer circuit of the present invention is implemented either in part or entirety by software.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

TABLE 1

| Q | STATE | Q' |
|---|---|---|
| 1 0, 1 1 | <0 | 0 1 (+1) |
| 0 0 | =0 | 0 0 (0) |
| 0 1 | >0 | 1 1 (−1) |

TABLE 2

| OPERATING SIGNAL | MEMORY 262 | CONVERTER CIRCUIT 224 | OUTPUT OF CONT. CC'T 263 | |
|---|---|---|---|---|
| 1 | 0 | 0 0 | 0 0 | ⎫ |
| 1 | 0 | 0 1 | 0 1 | ⎬ KILLER "OFF" |
| 1 | 0 | 1 0 | 1 0 | ⎬ |
| 1 | 0 | 1 1 | 1 1 | ⎭ |
| 1 | 1 | 0 0 | 1 1 | ⎫ |
| 1 | 1 | 0 1 | 1 1 | ⎬ KILLER "ON" |
| 1 | 1 | 1 0 | 1 1 | ⎬ |
| 1 | 1 | 1 1 | 1 1 | ⎭ |

Figure 16:
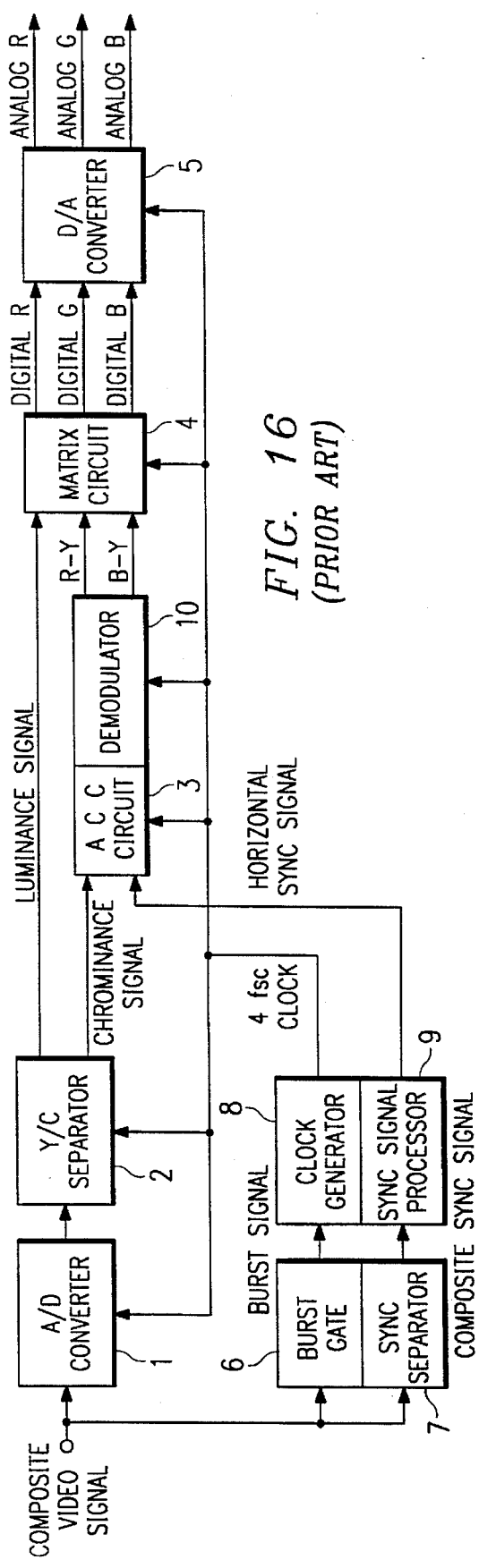
FIG. 16 shows a block circuit diagram of a prior art digital television receiver.

Referring to FIG. 17, an image or video processing system is shown implementing an ACC/ACK circuit 3 in similar fashion to that shown in the prior art of FIG. 16. A significant distinction between the prior art system and the present invention surrounds the reduced structure of the ACC/ACK device 3 which has been described above in detail and includes the elimination of a divider and vertical filter affording efficiencies in space and time.

In operation, the video or image processing system shown in FIG. 17 receives and processes video signals similarly to the prior art. A significant distinction and subject of the present invention entails the automatic normalizing or killing of the chrominance component of incoming color signals without using divider or vertical filter techniques. This ACC/ACK process has been described in detail above and is compatible with the overall video processing of the prior art.

As described hereinbefore, the digital ACC/ACK circuit and video processing system according to the present invention described above makes regulation of amplitude of color signal possible. Further, since there is no need of using a divider and/or vertical filter which causes the size of hardware to be large, it is possible to realize the digital ACC/ACK function automatically and with simple construction. Further, since the digital ACC/ACK circuit of the present

What is claimed is:

1. A method for digital automatic color control and chroma killing of a color signal, comprising:
   detecting when said color signal fails to meet a minimum signal value;
   modifying a stored coefficient by adding a preselected value having a binary value of +1, 0 or −1 to said stored coefficient once each horizontal line period of said color signal according to determined relationships between said color signal and a reference color signal if said color signal meets said minimum signal value, or by adding a binary −1 to said stored coefficient once each horizontal line period of said color signal if said color signal fails to meet said minimum signal value; and
   multiplying said color signal by said stored coefficient to produce a color out-put signal by interpreting said stored coefficient as a floating point number such that the stored coefficient is effectively modified by a value much less than 1 each horizontal line period, whereby said method for automatic color control operates as if a step of vertical filtering were included;
   such that said color signal is killed when said coefficient is reduced to zero and said color signal is automatically controlled when said coefficient is greater than zero.

2. The method of claim 1, wherein:
the step of multiplying comprises multiplying in parallel all data of a horizontal line of said color signal with said stored coefficient.

3. A digital method for image or video processing, comprising:
a) receiving a video or image signal;
b) separating said video or image signal into chrominance and luminance signals;
c) normalizing or killing said chrominance signals; and
d) developing color signals by combining signals resulting from step (c) with said luminance signals;
and wherein said step (c) includes:
  detecting when said chrominance signal fails to meet a minimum signal value;
  modifying a stored coefficient by adding a preselected value having a binary value of +1, 0 or −1 to said stored coefficient once each horizontal line period of said color signal according to determined relationships between said chrominance signal and a reference chrominance signal if said chrominance signal meets said minimum signal value, or by adding a binary −1 to said stored coefficient once each horizontal line period of said color signal if said chrominance signal fails to meet said minimum signal value; and
  multiplying said chrominance signal by said stored coefficient to produce a chrominance output signal by interpreting said stored coefficient as a floating point number such that the stored coefficient is effectively modified by a value much less than 1 each horizontal line period, whereby said method for automatic color control operates as if a step of vertical filtering were included;
such that said chrominance signal is killed when said coefficient is reduced to zero and said chrominance signal is automatically controlled when said coefficient is greater than zero.

4. A digital automatic color control and chroma killer (ACC/ACK) device, comprising:
ACK circuitry for detecting when a color signal fails to meet a minimum signal value; and
ACC circuitry for modifying amplitudes of said color signal comprising:
  a coefficient generator which forms a coefficient responsive to said ACK circuitry or according to determined relationships between said color signal and a reference color signal, wherein said coefficient generator comprises an adder which adds a binary value of +1, 0 or −1 to said coefficient once each horizontal line period of said color signal,
  a coefficient storage circuit for storing said coefficient connected to said coefficient generator, and
  a multiplier having a first input connected to an output of said coefficient generator and having said color signal connected to a second input and a color output signal connected to an output of said multiplier, wherein said multiplier is a floating point multiplier which interprets said coefficient as a floating point number such that the coefficient generator effectively changes the coefficient by a value much less than 1 each horizontal line period, whereby said ACC device operates as if a vertical filter were included,
such that said color signal is killed when said coefficient generator reduces said coefficient value to zero and said color signal is automatically controlled when said coefficient generator produces a non-zero coefficient value.

5. The ACC/ACK device of claim 4, wherein:
said multiplier multiplies in parallel all data of a horizontal line of said color signal with said coefficient.

6. A digital image or video processing system including:
separator circuitry for separating an incoming video or image signal into luminance and chroma components;
ACC/ACK device for normalizing or killing said chroma component;
processing circuitry for receiving said luminance component and said chroma component from said ACC/ACK device and outputting color signals;
said ACC/ACK device comprising:
  ACK circuitry for detecting when said chroma component fails to meet a minimum signal value; and
  ACC circuitry for modifying amplitudes of said chroma component comprising:
    a coefficient generator which form a coefficient responsive to said ACK circuitry or according to determined relationships between said chroma component and a reference color signal, wherein said coefficient generator comprises an adder which adds a binary value of +1, 0 or −1 to said coefficient once each horizontal line period of said chroma component,
    a coefficient storage circuit for storing said coefficient connected to said coefficient generator, and
    a multiplier having a first input connected to an output of said coefficient generator and having said chroma component connected to a second input and an output of said multiplier connected to said processing circuitry, wherein said multiplier is a floating point multiplier which interprets said coefficient as a floating point number such that the coefficient generator effectively changes the coefficient by a value much less than 1 each horizontal line period, whereby said ACC device operates as if a vertical filter were included,
such that said chroma component is killed when said coefficient generator reduces said coefficient value to zero and said chroma component is automatically controlled when said coefficient generator produces a non-zero coefficient value.

7. The image or video processing system as in claim 6, said system including:
synchronization circuitry for synchronizing operations within said system.

* * * * *